US012717600B2

(12) United States Patent
Thyagaturu et al.

(10) Patent No.: US 12,717,600 B2
(45) Date of Patent: Aug. 25, 2026

(54) METHODS AND APPARATUS TO PROCESS DATA PACKETS FOR LOGICAL AND VIRTUAL SWITCH ACCELERATION IN MEMORY

(71) Applicant: Intel Corporation, Santa Clara, CA (US)

(72) Inventors: Akhilesh Thyagaturu, Tempe, AZ (US); Vinodh Gopal, Westborough, MA (US); Tonia Morris, Wendell, NC (US)

(73) Assignee: Intel Corporation, Santa Clara, CA (US)

( * ) Notice: Subject to any disclaimer, the term of this patent is extended or adjusted under 35 U.S.C. 154(b) by 29 days.

(21) Appl. No.: 17/133,194

(22) Filed: Dec. 23, 2020

(65) Prior Publication Data

US 2021/0149707 A1 May 20, 2021

(51) Int. Cl.

| | |
|---|---|
| ***G06F 9/455*** | (2018.01) |
| ***G06F 9/38*** | (2018.01) |
| ***G06F 9/54*** | (2006.01) |
| ***G06F 16/901*** | (2019.01) |

(52) U.S. Cl.

CPC ........ *G06F 9/45558* (2013.01); *G06F 9/3877* (2013.01); *G06F 9/544* (2013.01); *G06F 16/9017* (2019.01); *G06F 2009/45579* (2013.01); *G06F 2009/45595* (2013.01)

(58) Field of Classification Search

None

See application file for complete search history.

(56) References Cited

U.S. PATENT DOCUMENTS

| | | | | |
|---|---|---|---|---|
| 8,274,971 | B2 * | 9/2012 | Battle | H04L 47/6225 370/357 |
| 11,474,965 | B2 | 10/2022 | Lea | |
| 2009/0141732 | A1 * | 6/2009 | Woo | H04L 47/17 370/412 |
| 2018/0083866 | A1 | 3/2018 | Gobriel et al. | |
| 2019/0075063 | A1 * | 3/2019 | Mcdonnell | H04L 49/70 |

OTHER PUBLICATIONS

Shantharama et al. "Hardware-Accelerated Platforms and Infrastructures for Network Functions: A Survey of Enabling Technologies and Research Studies," IEEE Access, vol. 8, Jul. 29, 2020, 65 pages.

(Continued)

*Primary Examiner* — Bradley A Teets
*Assistant Examiner* — Melissa A Headly
(74) *Attorney, Agent, or Firm* — Hanley, Flight & Zimmerman, LLC

(57) ABSTRACT

Methods, apparatus, systems, and articles of manufacture to process data packets for logical and virtual switch acceleration in memory are disclosed. An example memory includes an input packet buffer to store an inbound data packet from a network; an output packet buffer to store an outbound data packet to transmitted via the network; and programmable logic to: read the inbound data packet from the input packet buffer; process the inbound data packet to determine the outbound data packet; and output the outbound data packet to the output packet buffer.

25 Claims, 7 Drawing Sheets

(56) References Cited

OTHER PUBLICATIONS

Luderer et al. "A Distributed UNIX System Based on a Virtual Circuit Switch," ACM SIGOPS Operating Systems Review 15.5, 1981, 9 pages.
Ruth et al. "Virtual Distributed Environments in a Shared Infrastructure," published by IEEE Computer Society, pp. 63-69, May 2005, 7 pages.
Zhou, "Virtual Networking," ACM SIGOPS Operating Systems Review 44.4, published Dec. 13, 2010, 6 pages.
Seshadri et al. "Ambit: In-Memory Accelerator for Bulk Bitwise Operations using Commodity DRAM Technology," 50th Annual IEEE/ACM International Symposium on Microarchitecture (Micro). IEEE, 2017, 15 pages.
Zhu et al. "A 3D-Stacked Logic-in-Memory Accelerator for Application-Specific Data Intensive Computing." IEEE international 3D systems integration conference (3DIC). IEEE, 2013, 7 pages.
Imani et al. "FloatPIM In-Memory Acceleration of Deep Neural Network Training with High Precision." ACM/IEEE 46th Annual International Symposium on Computer Architecture (ISCA). IEEE, Jun. 22-26, 2019, 14 pages.
Chi et al. "PRIME: A Novel Processing-in-Memory Architecture for Neural Network Computation in ReRAM-based Main Memory." ACM/IEEE 43rd Annual International Symposium on Computer Architecture, pp. 27-39, 2016, 13 pages.
European Patent Office, "European Search Report," issued in connection with Application No. 21196255.0, dated Feb. 28, 2022, 14 pages.
Docs » Sample Applications User Guides, "18. L2 Forwarding Sample Applications (in Real and Virtualized Environments)," retrieved from: https://doc.dpdk.org/guides/sample_app_ug/I2_forward_real_virtual.html, retrieved on Sep. 15, 2022, 11 pages.
Chan's Blog, "NSX Logical Switch,", retrieved from: http://chansblog.com/tag/nsx-logical-switch/#:~: text=Logical%20Switch%20within%20NSX%20is,group%20in%20each%20distributed%20switch, dated Feb. 22, 2015, 10 pages.
Center, NSX-T. Data. "Advanced Design NSX-T Data Center 2.4." retrieved from: https://docs.vmware.com/en/VMware-NSX-T-Data-Center/index.html, retrieved on Sep. 15, 2022, 3 pages.
Kaljic et al., "An implementation of a deeply programmable SDN switch based on a hybrid FPGA/CPU architecture," ResearchGate, Conference Paper, 18th International Symposium Infoteh-Jahorina (Infoteh), Mar. 2019, 7 pages.
European Patent Office, "Communication pursuant to Article 94(3) EPC," issued in connection with European Patent Application No. 21 196 255.0-1215, dated Jun. 5, 2024, 12 pages.
Mulnix et al., "Intel® Xeon® Processor D-2100 Product Family Technical Overview," Intel, accessed from https://www.intel.com/content/www/us/en/developer/articles/technical/intel-xeon-processor-d-2100-product-family-technical-overview.html on Aug. 1, 2025, last updated May 8, 2018, 19 pages.

* cited by examiner

METHODS AND APPARATUS TO PROCESS DATA PACKETS FOR LOGICAL AND VIRTUAL SWITCH ACCELERATION IN MEMORY

FIELD OF THE DISCLOSURE

This disclosure relates generally to processing devices, and, more particularly, to methods, systems, articles of manufacture, and apparatus to process data packets for logical and virtual switch acceleration in memory.

BACKGROUND

A processing system may include an operating system to execute instructions of an application or virtual machine using processing cores of the processing system. The processing system may further include communication hardware (e.g., a network interface controller (NIC)) to connect the processing system to a computer network. The communication hardware facilitates the transmission and/or reception of data based on instructions from an application operating on the processing unit.

BRIEF DESCRIPTION OF THE DRAWINGS

The figures are not to scale. In general, the same reference numbers will be used throughout the drawing(s) and accompanying written description to refer to the same or like parts.

Figure 1:
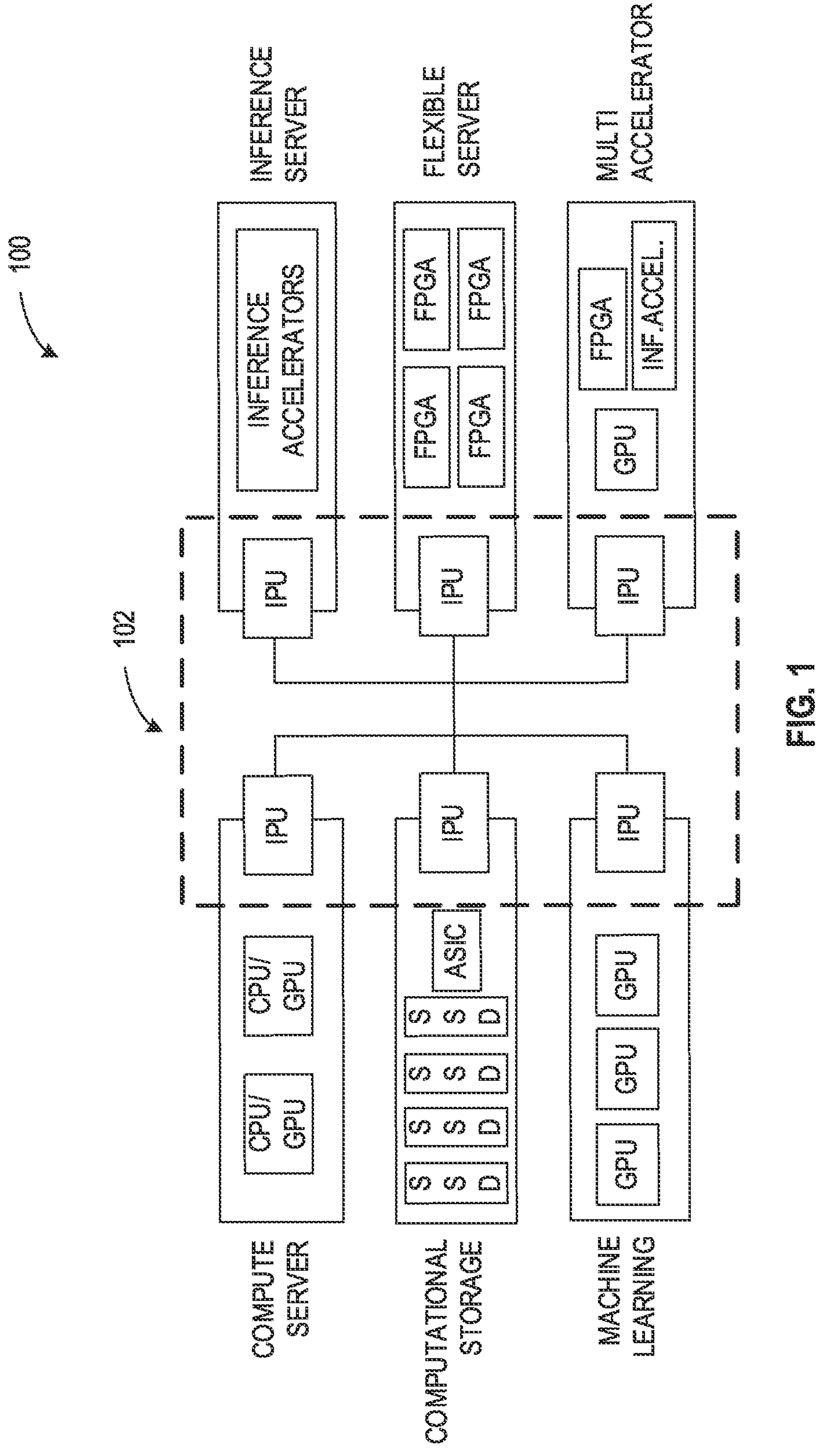
FIG. 1 is a block diagram of an example implementation of a computing system including an example infrastructure processing unit.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

A processing system is electronic circuitry that includes one or more processing units (e.g., a central processing unit (CPU), graphical processing unit (GPU), etc.) that execute instructions making up a program or workload. The processing unit may include one or more processor cores to execute the instructions by accessing data from main memory based on instructions from an application via an operating system (OS) or a hypervisor. The OS/hypervisor is system software that manages hardware of the processing unit (e.g., the NIC, PHY, memory, etc.) based on a set of instructions. The processing unit may further include and/or otherwise be in communication with memory. The processing unit can access and store data from/in the memory (e.g., via an input/output (I/O)) corresponding to the instructions of the OS/hypervisor. The processing unit may further include a network interface controller (NIC) to receive and/or transmit data via a network.

Hardware components of traditional computing systems rely on the programmable software of the applications and/or the OS/hypervisor to perform functions and/or logic on any data obtained by and/or stored in such hardware components. Accordingly, even minor logic tasks require I/O bandwidth and CPU/GPU/core processor resources to execute. To reduce the I/O bandwidth and free up the CPU/GPU/cores from executing such tasks, enhanced hardware components may be utilized that include programmable logic to execute computational tasks instead of the CPU and/or GPU. In some examples, the programmable logic implemented in the hardware components may be limited, but sufficient to perform the tasks to eliminate the I/O and/or CPU/GPU resources needed to perform the tasks. Such enhanced hardware (herein referred to as an infrastructure processing unit (IPU)) corresponds to hardware components, such as memory, NIC, etc., including some programmable logic to perform particular tasks.

An IPU may an enhanced version of a smart NIC, an enhanced version of memory, and/or an advanced version of any hardware component. A Smart NIC is a NIC that delivers a programmable high-performance networking capability by adding features (e.g., virtual switch offloading, storage offloading, compression, cryptography, virtualization, etc.) to a traditional NIC. Some smart NICs provide offload capability like security (e.g., key stores) and other virtualization services to reduce the overall overhead of the OS/virtual machine manager (VMM) (e.g., a hypervisor). An IPU furthers enhances the functionalities of the smart NIC by delivering (a) efficient high-performance software programmable multi-core CPU/GPU for supporting infrastructure services like management (e.g., telemetry), service mesh offload, and distribution security services, (b) flexible and programmable acceleration engines (e.g., a rich set of flexible and programmable acceleration engines that offload and improve applications performance for artificial intelligence (AI)/machine learning, security, telecommunications, storage, etc.), and (c) stream based interfaces for high performance data movement attached xPU—peripheral component Interconnect Express (PCLe) and compute express link (CXL) (e.g., host and target), ethernet and other emerging capabilities. The IPU is further described below in conjunction with FIG. 1.

In virtual switching and logical switching environments, data obtained at a NIC, a smart NIC, or IPU from a device is processed and/or manipulated (e.g., to adjust the header, decrement a time-to-live (TTL) count, etc.) and transmitted to the device or another device in a network. For every received data packet in traditional systems, the CPU/GPU must access the data from memory using the I/O, perform the task, and store the data back into the memory using the I/O. Although the amount of I/O bandwidth and CPU/GPU resources needed to obtain, process, and store a single data packet may be small, if the number of received packets is high, the amount of I/O bandwidth and CPU/GPU resources needed to process the large number of packets is high. Thus, the I/O and CPU/GPU may not have bandwidth to execute other tasks.

Examples disclosed herein utilize logic in the hardware components of a system (e.g., in-memory acceleration) for switching and packet processing. In this manner, the logic implemented in the hardware (e.g., memory) can process/manipulate incoming data packets and store the manipulated data packets for the NIC and/or an IPU to transmit without the use of the cores of the processing system. For example, instead of the CPU/GPU/cores of a system accessing, processing, and storing every inbound data packet, the OS/hypervisor 240 programs the programmable logic implemented in a hardware component (e.g., system memory, NIC, IPU, etc.) to perform the accessing, processing, and storing of inbound data. In this manner, examples disclosed herein reduce the use of CPU/GPU processing resources and reduce the I/O bandwidth of traditional switching and/or packet processing techniques.

FIG. 1 is an example computing system 100 that includes example IPUs 102. The IPUs 102 may be the control points where the accelerator once connected directly to the CPU (or GPU, other processing unit, etc.). Thus, use of the IPUs 102 allow particular functions/operations to occur without the use of the CPU/GPU, thereby reducing overall infrastructure and data movement tax. Additionally, use of the IPUs 102 further helps to provide better isolation between a cloud solution provider (CSP) and tenants in the control point role of the IPUs 102. Because the IPUs 102 are highly distributed, the IPUs 102 can provide protection for end-user data and services and also provide auditable accounting that attests that the protection was not compromised.

In the example computing system 100 of FIG. 1, one or more of the example IPUs 102 can perform tasks that could otherwise be performed by an OS or a guest OS (e.g., software installed on either a virtual machine (VM) that is different than the host operating system). For example, resource management, device virtualization, event and usage logging, service mesh (routing, NAT, load balancing), reliable transport schemes, and/or a virtual switch (vSwitch) can be executed by accelerators and processors on the one or more IPUs 102. One or more of the example IPUs 102 can execute drivers to interface with an OS or a guest OS on a host system as well as an other processing unit (xPU), or storage devices.

The example IPUs 102 of FIG. 1 can include, be implemented with, and/or access a secure resource manager, offload circuitry, a network interface controller, security, a root of trust, a resource composition, a time stamp manager, memory, storage, processors, and/or accelerators.

A compute fabric can provide connectivity to a local host or device (e.g., server, device (e.g., xPU)). Connectivity with a local host or device or smartNIC or another IPU can be provided using one or more of peripheral component interconnect express (PCIe), ARM AXI, Intel® QuickPath Interconnect (QPI), Intel® Ultra Path Interconnect (UPI), Intel® On-Chip System Fabric (IOSF), Omnipath, Ethernet, Compute Express Link (CXL), HyperTransport, NVLink, Advanced Microcontroller Bus Architecture (AMBA) interconnect, OpenCAPI, Gen-Z, CCIX, Infinity Fabric (IF), and so forth. Various embodiments of the host connectivity provide symmetric memory and caching to enable equal peering between CPU, XPU, and IPU (e.g., via CXL.cache and CXL.mem).

A media interface can provide connectivity to a remote smartNIC or another IPU or service. The connection may be provided over any type of network media (e.g., wired or wireless) and using any protocol (e.g., Ethernet, Infiniband, Fiber channel, ATM, etc.).

In some examples, instead of the server/CPU/GPU being the primary component managing one or more of the IPUs 102 of FIG. 1, the IPUs 102 can be the root of a system (e.g., rack of servers or data center) and can manage compute resources (e.g., CPU, GPU, XPU, storage, memory, etc.) in the IPU 102 and/or outside of the IPU 102.

In some examples, the IPUs 102 of FIG. 1 can provide orchestration to decide where to execute a workload based on available resources (e.g., services and devices) and by considering service level agreements and latencies, to determine whether resources (e.g., CPU, GPU, XPU, storage, memory) are to be allocated from the local host or from a remote host or pooled resource. When one of the IPUs 102 is selected to perform a workload, a secure resource manager can offload work to a CPU, GPU, xPU, or other device, and the IPU 102 can accelerate connectivity of distributed runtimes, reduce latency, CPU, GPU and increase reliability. For example, a secure resource manager of one of the IPUs 102 can run a service mesh to decide what resource is to execute a workload, and provide for L7 (application layer) and remote procedure call (RPC) traffic to bypass the kernel altogether so that a user space application can communicate directly with the IPU 102 (e.g. the IPU 102 and application can share a memory space). A service mesh can be a configurable, low-latency infrastructure layer designed to handle communication among application microservices using application programming interfaces (APIs) (e.g., over RPCs). A service mesh can provide fast, reliable, and secure communication among containerized application infrastructure services. The service mesh can provide critical capabilities including service discovery, load balancing, encryption, observability, traceability, authentication and authorization, and support for the circuit breaker pattern.

Communications can transit through a media interface of one or more of the IPUs 102 of FIG. 1 through a media to a NIC/smartNIC (for cross node communications) or loopback back to a local service on the same host. Communications through a media interface of one of the IPUs 102 to another one of the IPUs 102 can then use shared memory support transport between xPUs switched through the local IPUs. Use of IPU-to-IPU communication can reduce latency and jitter through ingress scheduling of messages and work processing based on service level objective (SLO). For example, for a request to a database application that requires a response, one of the IPUs 102 can prioritize the processing to minimize the stalling of the requesting application. The IPU 102 can schedule the prioritized message request issuing the event to execute a SQL query database and the IPU 102 can construct microservices that issue SQL queries and the queries are sent to the appropriate devices or services.

One or more of the IPUs 102 of FIG. 1 can be dynamically selected to run a given workload (e.g., microservice) within a composable infrastructure including an IPU, xPU, CPU, GPU, storage, memory, and other devices in a node.

Figure 2:
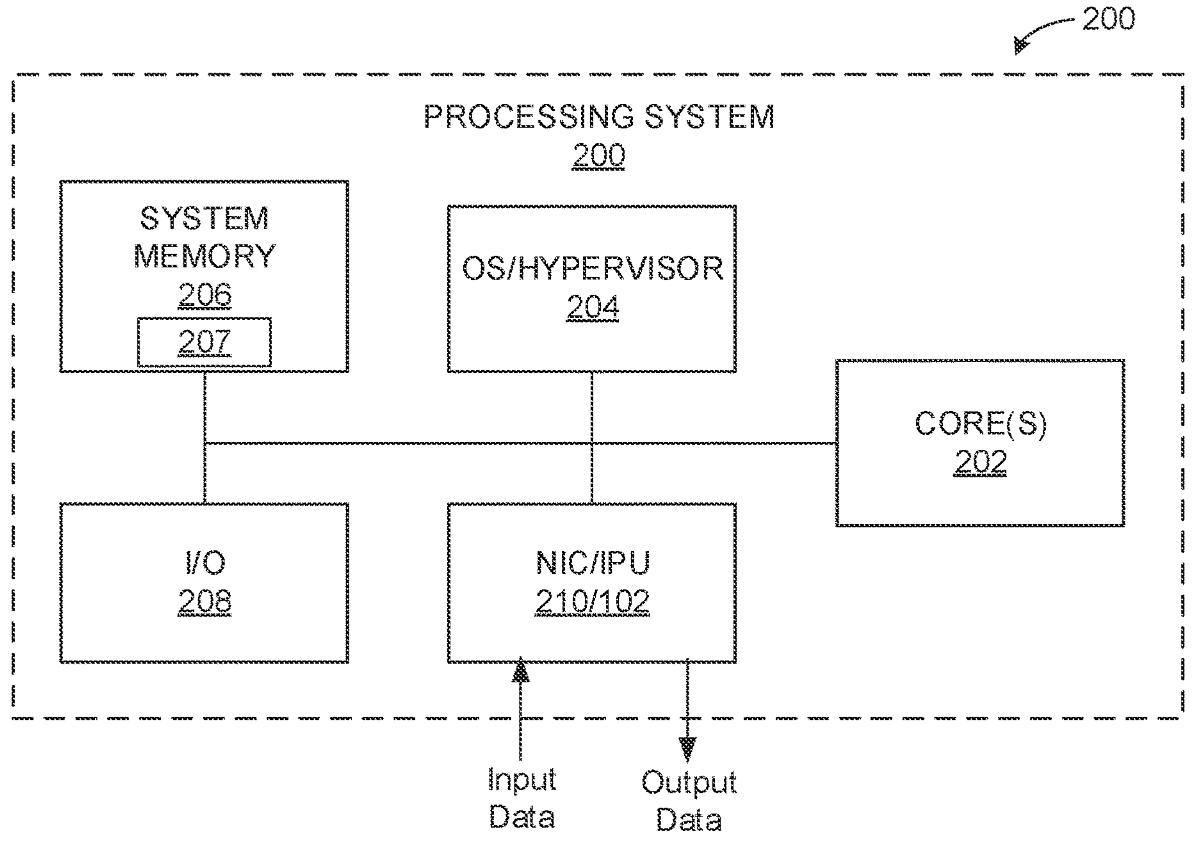
FIG. 2 is a block diagram of an example implementation of a processing system described in conjunction with examples disclosed herein.

FIG. 2 is a block diagram of an example implementation of an example processing system 200. The example processing system 200 of FIG. 2 includes example core(s) 202, an example OS/hypervisor 204, an example system memory 206, example Input/Output (I/O) 208, and an example NIC/IPU 210/102. The example system memory 206 includes example switch acceleration logic 207. Although the example switch acceleration logic 207 is implemented in the example system memory 206, the switch acceleration logic 207 may be implemented as part of the example NIC/IPU 210/102. The example NIC 210 may be a traditional NIC, a smart NIC, the IPU 102 of FIG. 1, etc.

The example processing system 200 of FIG. 2 is any type of processing unit (e.g., a CPU, a GPU, an accelerated processing unit (APU), general purpose GPU (GPGPU), etc.). For example, the processing system 200 may be an embedded system, a field programmable gate array, a shared-memory controller, a network on-chip, a networked system, and/or any other circuitry that includes a hardware (e.g., semiconductor based) processor, memory, and/or cache. The example processing system 200 utilizes processor resources (e.g., the logic circuitry of the example processor core(s) 202) to execute instructions to implement the example OS/hypervisor 204. The example processor core(s) 202 of FIG. 2 execute(s) instructions (e.g., a workload) from the example OS/hypervisor 204 (e.g., by reading and/or writing data). The processing system 200 may enable one or more of the core(s) 202 to execute the instructions.

The example OS/hypervisor 204 of FIG. 2 is a software system that may exhibit one or more computation phases to perform one or more tasks. The OS/hypervisor 204 may implement instructions from an application or a virtual machine. The example OS/hypervisor 204 uses the resources of the core(s) 202 to carry out instructions to perform the one or more tasks. As described above, traditional processing systems required the OS/hypervisor 204 to use the core(s) 202 to process inbound data packets in virtual or logical switching protocols. In such traditional examples, the OS/hypervisor 204 uses the core(s) 202 to access a data packet from the system memory 206 using the example I/O 208, thereby using CPU/GPU resources and I/O bandwidth to obtain a data packet, process the data packet, and store the processed data packet (herein also referred to as outbound data packet) back into the system memory 206 to be transmitted out. However, the example IPU 207 and/or the example IPU 102 of FIG. 1 performs such tasks at the example system memory 206 to conserve I/O bandwidth and CPU/GPU resources. The example OS/hypervisor 204 is further described below in conjunction with FIG. 4.

The example system memory 206 of FIG. 2 stores data that is obtained from the example NIC/IPU 210/102. The example system memory 206 includes and/or otherwise incorporates the example switch acceleration logic 207. Because the example system memory 206 includes the example switch acceleration logic 207, the example system memory 206 is an IPU-based memory and may be referred to as a type of IPU. Although the memory 206 is illustrated herein as system memory 206, more generally, the memory 206 can correspond to any memory circuitry implemented in accordance with teachings of this disclosure to include the switch acceleration logic 207 and associated elements to process data packets for logical and virtual switch acceleration The example switch acceleration logic 207 of FIG. 2 is logic implemented in the example system memory 206 to process data packets stored in the example system memory 206 from the example NIC/IPU 210/102. For example, the switch acceleration logic 207 may process an obtained data packet by replacing and/or adjusting the header of the data packet, decrementing a time to live (TTL) value of the data packet, etc. The example switch acceleration logic 207 includes an interface to obtain instructions from the example OS/hypervisor 204 regarding how to implement the switch acceleration. For example, the OS/hypervisor 204 may transmit instructions regarding memory address locations (e.g., queue buffers) for storing obtained data packets, logic for processing and/or manipulating the obtained data packets, and/or instructions regarding memory address locations (e.g., queue buffers) for storing the manipulated data packets. In this manner, the example NIC 210/IPU 102 can access the manipulated data packets and transmit to a device via a network connection (e.g., Ethernet, Wi-Fi, cellular, etc.). The example system memory 206 and/or the example switch acceleration logic 207 are further described below in conjunction with FIGS. 3 and 4.

The example I/O 208 of FIG. 2 is a communication component between the OS/hypervisor 204 and the memory 206. The I/O 208 allows the OS/hypervisor 204 to access and/or store data from/in the example system memory 206.

The example NIC/IPU 210/102 of FIG. 2 is hardware and/or hardware including programmable logic that schedules data transmission based on instructions from the OS/hypervisor 204. In some examples, the NIC 210 pulls and/or reads data from the system memory 206 for transmission and stores the data in various queues (e.g., corresponding to a traffic class). The NIC 102 may be a traditional NIC, a smart NIC, or the IPU 102. When the example NIC/IPU 210/102 is a smart NIC or IPU, the NIC/IPU 210,102 includes programmable logic to perform particular operations, tasks, and/or functions without use of the example OS 204, I/O 208, and/or core(s) 202. For example, the NIC/IPU 210/102 may include the example switch acceleration logic 207 to access obtained data packets, manipulate the obtained data packets, and store the manipulated data packets for subsequent transmission. In such an example the NIC/IPU 210/102 may access the data packets and store the manipulated data packets from the example system memory 206. In some examples, the switch acceleration logic 207 may be implemented in the NIC/IPU 210/102 and the switch acceleration logic 207 may operate on the data packets in the local memory of the example NIC/IPU 210/102. In this manner, switch acceleration can occur on data packets at the NIC/IPU 210/102 without storing the data packets in the system memory 206.

Figure 3:
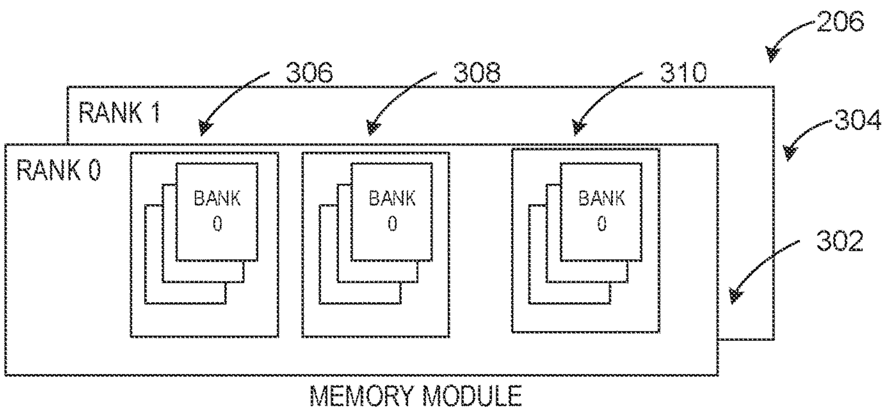
FIG. 3 is a block diagram of an example implementation of the example system memory and the example switch acceleration logic of FIG. 1.
Figure 3:
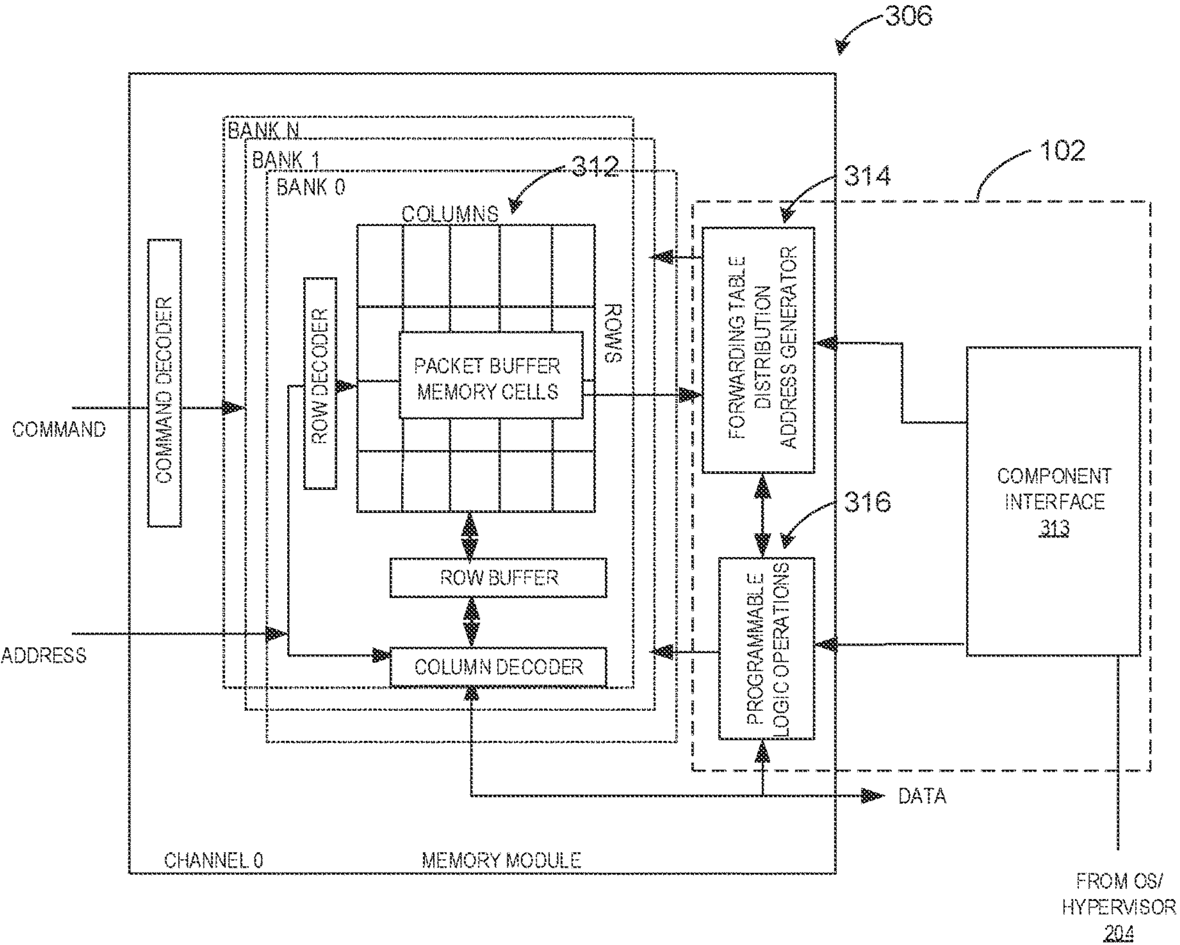

FIG. 3 is a block diagram of an example implementation of the IPU-based system memory 206 of FIG. 2. The example IPU-based system memory 206 of FIG. 3 includes the example switch acceleration logic 207 of FIG. 2. The example IPU-based system memory of FIG. 3 further includes example memory ranks 302, 304, and example memory chips 306, 308, 310. The example memory chip 306 includes example memory cells 312. The example switch acceleration logic 207 includes an example component interface 313, an example destination memory address generator 314, and an example programmable logic 316. Although the system memory 206 of FIG. 3 is implemented as a dynamic random access memory (DRAM), the system memory 206 can be implemented by any other type of memory.

The example system memory 206 of FIG. 3 is divided into two ranks 302, 304. The memory ranks 302, 304 is a block or area of data that is created using some or all of the memory chips 306, 308, 310 of the system memory 206. In some examples, the memory ranks 302, 304 is a set of DRAM chips connected to the same chip select, which can be accessed simultaneously. However, the system memory 206 may include any number of ranks and/or chips. Each chip 306, 308, 310, etc., may further be divided into one or more banks. The example chip 306 includes the example memory cells 312 reserved as packet buffers (e.g., memory space reserved for storing received packets or packets awaiting transmission of a network). A memory cell of the memory cells 312 may be identified by a memory address defined by a row identifier and a column identifier. The memory cells 312 are logically partitioned to hold the packets in the queues of input and output ports for transmission (e.g., input and output ports of the NIC/IPU 210/102). When the NIC/IPU 210/102 obtains a new packet, the NIC/IPU 210/102 stores the obtained data packet in the example memory cells 312. When the NIC/IPU 210/102 is ready to transmit a data packet, the NIC/IPU 210/102 pulls the data from the memory cells 312.

The example component interface 313 of FIG. 3 interfaces with the OS/hypervisor 204 to receive instructions on how to program, and/or otherwise implement, the example address generator 314 and the programmable logic 316. For example, the component interface 313 may receive forwarding/switching table information to implement the destination address generator 314. Additionally, the component interface 313 may obtain instructions on how to process and/or manipulate obtained data packets as part of the virtual switching and/or logical switching routine. In this manner, the OS/hypervisor 204 only sends one instruction to allow the switch acceleration logic 207 to perform the packet processing, thereby freeing up CPU/GPU resources and/or I/O bandwidth for other operations.

The example address generator 314 of FIG. 3 pulls and/or reads a data packet in an input (also referred to as inbound) buffer queue of the example memory cells 312 when the data packet is obtained. Because the address generator 314 obtains the data packet from the memory cells 312, the address generator 314 knows the memory address and/or a buffer queue identifier corresponding to where the obtained data packet was stored. In some examples, the programmable logic 316 obtains the new data packet from the input buffer and transmits the data packet to the address generator 314 along with the memory address location of where the data packet was stored (or other identifier of the input buffer queue). In some examples, the address generator 314 and the programmable logic 316 poll and/or read the data from the input buffer at the same time. The example address generator 314 may pass (e.g., transmit) the data to the example programmable logic 316 and may generate an address (e.g., corresponding to a buffer queue) for storing the data packet after the programmable logic 316 has processed the data packet. The example address generator 314 may be, or include, a forwarding/switching table, one or more switches, and/or a multiplexer to select a destination memory address based on the memory address where the data packet was obtained from (e.g., table corresponding to a input to output buffer mapping) and/or based on any protocol that allows the NIC/IPU 210/102 to know where to pull the data from when the processed data is ready to be sent. After the example programmable logic 316 processes the data packet, the example address generator 314 outputs a control signal to the drivers of the memory cells 312 corresponding to the determined destination address (e.g., and/or output (also referred to as outbound) packet buffer and/or queue) to ensure that the manipulated data from the programmable logic 316 is stored in the destination address.

The example programmable logic 316 accesses data packets obtained by the NIC/IPU 210/102 and stored in the memory cells 312, and processes the data cells according to a predefined protocol, operation, and/or function (e.g., obtained at the component interface 313 from the OS/hypervisor 204), etc., or any combination thereof. Although some acceleration protocols only include binary operations to replace headers and/or decrement TTL values of data packets, the example programmable logic 316 can perform any type of manipulation based on instructions from the OS/hypervisor 204.

Figure 4:
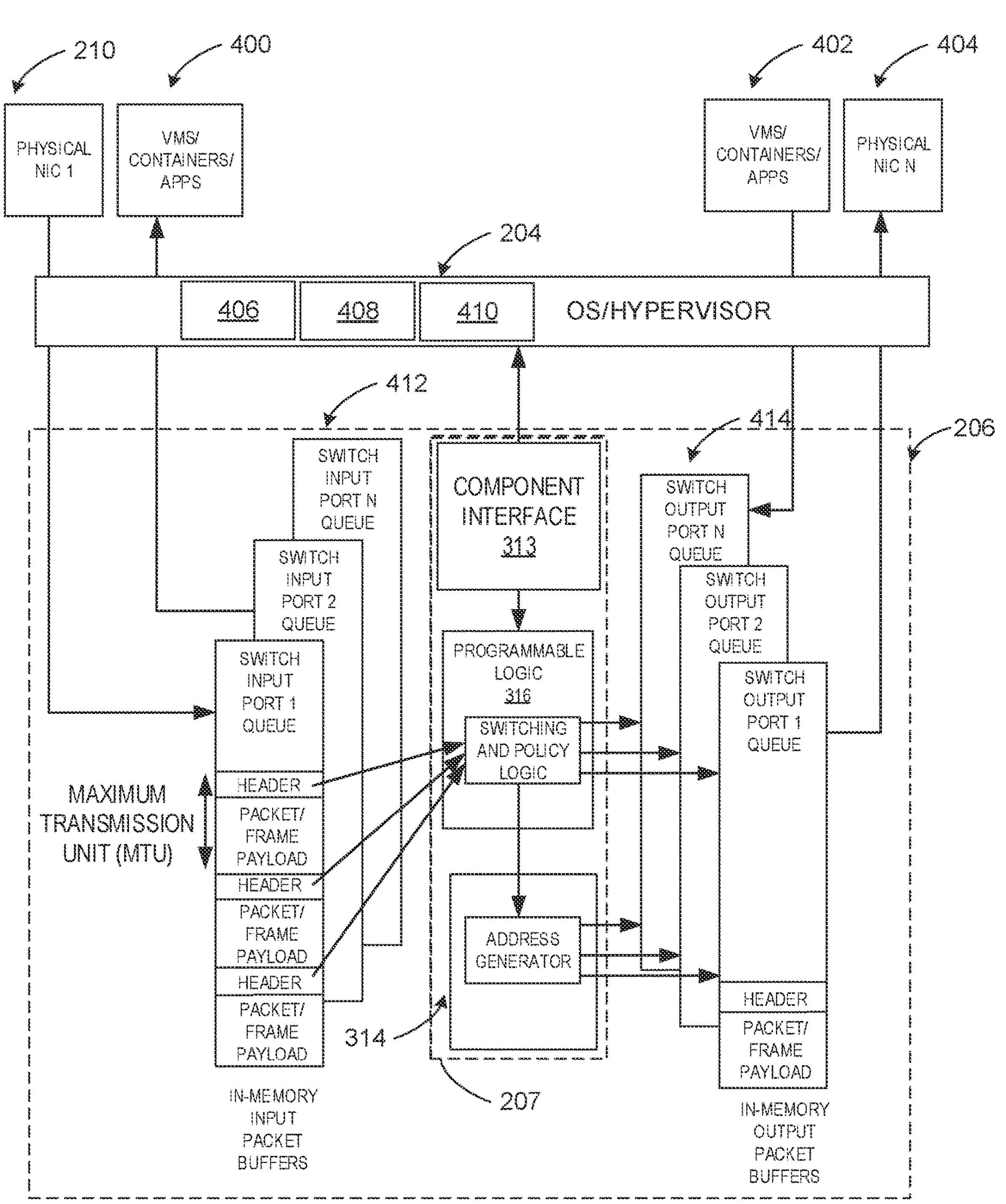
FIG. 4 is an additional block diagram of an example implementation of the example system memory, the example switch acceleration logic, and the example operating system/hypervisor of FIG. 1.

FIG. 4 is an additional block diagram of an example implementation of the example IPU-based system memory 206 of FIG. 2 in conjunction with the example OS/hypervisor 204 and the NIC/IPU 210 of FIG. 2. FIG. 4 includes the example component interface 313, the example memory address generator 314, and the example programmable logic 314 of the acceleration logic 207 of FIG. 3. FIG. 4 further includes example virtual machines, container, and/or applications 400, 402, an example NIC 404, example input packet buffers 412, and example output packet buffers 414. The example packet buffers 412, 414 are dedicated sections of the memory cells 312 of FIG. 3. The example OS/hypervisor 204 includes an example VM/container/application interface 406, an example programmable logic generator 408, and an example component interface 410.

The example VMs 400, 402 are aware of the in-memory switch implementation. In some examples, data corresponding to the in-memory switching may be transmitted between the system memory 206 (e.g., directly or via the OS/hypervisor 204. Additionally, the example VMs 400, 402 may pass information to the example system memory 206 to be processed according to example disclosed herein (e.g., passing the information from the VM 400 to the VM 402 via the memory 206).

The example OS/hypervisor 204 of FIG. 4 includes the example VM/container/application interface 406 to obtain logical and/or virtual switch implementation details from the example VMs/containers/applications 400, 402 corresponding to how to implement the example acceleration logic 207. The logical and/or virtual switch implementation details may include input ports (e.g., the input packet buffers 412 where inbound data packets will be store in the system memory 206), the output ports (e.g., the output packet buffers 414 where the processed data packets will be stored), an input to output buffer mapping (e.g., for implementing in a forward table of the example address generator 314) and the packet processing information (e.g., functions, operations, and/or instructions corresponding to how the data packets are to be processed).

The example programmable logic instruction generator 408 of FIG. 4 converts the logical and/or virtual switch implementation details into implementation instructions to program the example memory address generator 314 and the example programmable logic 316 of the example acceleration logic 207. The example programmable logic instruction generator 408 transmits the implementation instructions to the example acceleration logic 207 via the example component interface 410.

The example input buffers 412 correspond to a group of the memory cells 312 of FIG. 3 dedicated to input data packets. The input buffers (e.g., input queues) correspond to a port number and/or other identifier. The input buffers 412 may be maximum transmission unit (MTU)-aligned such that the headers of the input data can be intercepted and interpreted by the programmable logic 314. The example programmable logic 316 can perform a header interpretation action on a packet and the example memory address generator 314 can generate the output port address for the processed packet based on the forwarding table of the memory address generator 314. The forwarding table may be a look up table that determines where to store outbound packets based on where the inbound packet was stored, where the outbound data packet is going to be transmitted to etc. In some examples, the read and write are also aligned to a cache line width. In some such examples, the address and payload partitioning follow the alignment of cache lines. After the example acceleration logic 207 obtains and processes input data from the input queues 312, the example acceleration logic 207 stores the processed data into one of the output buffers 414 based on the address information and/or output packet buffer information generated by the example address generator 314. A data transfer controller may be included to ensure that the data copy at the packet/frame level is ready to be processed as soon as the data write to the packet buffer is complete (e.g., in the form of a complete packet), estimated from the frame boundary and total packet size value in the header. The complete packet at the input buffers 412 triggers packet processing as well as the packet copies into the output packet buffers 414. In some example, the output packet buffers 414 correspond to different transmission locations and/or may correspond to the input packet buffers 412. Accordingly, the example address generator 314 may select one of the output packet buffers 414 to store a processed data packet based on the location where the processed data packet is to be transmitted to and/or where the input packet buffer 412 where the corresponding inbound packet (e.g., the outbound packet prior to processing) was stored.

The in memory acceleration of a logical and virtual switch protocol can be applied at different levels. In some examples, NICs (e.g., NIC 210, 404) that are connected to the acceleration logic 207 can implement packet forwarding from one port to another without the help of the CPU/GPU and/or other software outside the system memory 206 to forward the pack from one port of a NIC to another. In some examples, a kernel module for the IPU-based memory system 206 may implement control plane functions (e.g., establishing the forwarding table, handling exceptions, buffer control, and flow control (e.g., when the output packet buffers 414 are full). In some examples, the example acceleration logic 207 is a user space service manager that helps in coordinating the virtual and logical switch control plane with an orchestrator, to enable software defined networking principles at global scale (e.g., to establish a logical distributed switch). In some examples, threads and processes may implement the example acceleration logic 207. In such examples, the threads and processes may read/write asynchronously to the buffer queues 412, 414 to prevent contentions. Threads will poll respective queues and, if a packet is not found during a particular cycle of the output port queue poll, then the packet will be pulled during a subsequent polling cycle. The output port thread knows that the packet is not available to read until the complete packet is written/present in the output packet buffer 414.

In some examples, the input packet buffer 412 is first means for storing an inbound data packet from a network, the output packet buffer 414 is second means for storing an outbound data packet to be transmitted via the network, the programmable logic 316 is means for processing the inbound data packet based on a protocol configured by an instruction from an operating system to determine the outbound data packet, the means for processing to access the inbound data packet from the first means, and output the outbound data packet to the second means, the address generator 314 is second means for determining that the outbound data packet is to be stored in a first one of a plurality of output packet buffers, the means for determining to output a control signal to a driver to cause the outbound data packet to be stored in the first one of the output packet buffers, and the interface 313 is means for obtaining instructions from an operating system, the instructions corresponding to a forwarding table and/or to program the programmable logic 316.

While example manners of implementing the example OS/Hypervisor 204 and the example acceleration logic 207 are illustrated in FIGS. 3 and 4, one or more of the elements, processes and/or devices illustrated in FIGS. 3 and/or 4 may be combined, divided, re-arranged, omitted, eliminated and/or implemented in any other way. Further, the example component interface 313, the example memory address generator 314, the example programmable logic 316, the example VM/container/application interface 406, the example programmable logic generator 408, and the example component interface 410, and/or, more generally, the example processing system 100 of FIGS. 1, 2, and/or 4 may be implemented by hardware, software, firmware and/or any combination of hardware, software and/or firmware. Thus, for example, any of the example component interface 313, the example memory address generator 314, the example programmable logic 316, the example VM/container/application interface 406, the example programmable logic generator 408, and the example component interface 410, and/or, more generally, the example OS/Hypervisor 204 and the example acceleration logic 207 of FIGS. 3 and/or 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example component interface 313, the example memory address generator 314, the example programmable logic 316, the example VM/container/application interface 406, the example programmable logic generator 408, and the example component interface 410, and/or, more generally, the example OS/Hypervisor 204 and the example acceleration logic 207 of FIGS. 3 and/or 4 is/are hereby expressly defined to include a non-transitory computer readable storage device or storage disk such as a memory, a digital versatile disk (DVD), a compact disk (CD), a Blu-ray disk, etc. including the software and/or firmware. Further still, the example OS/Hypervisor 204 and the example acceleration logic 207 may include one or more elements, processes and/or devices in addition to, or instead of, those illustrated in FIGS. 3 and/or 4, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
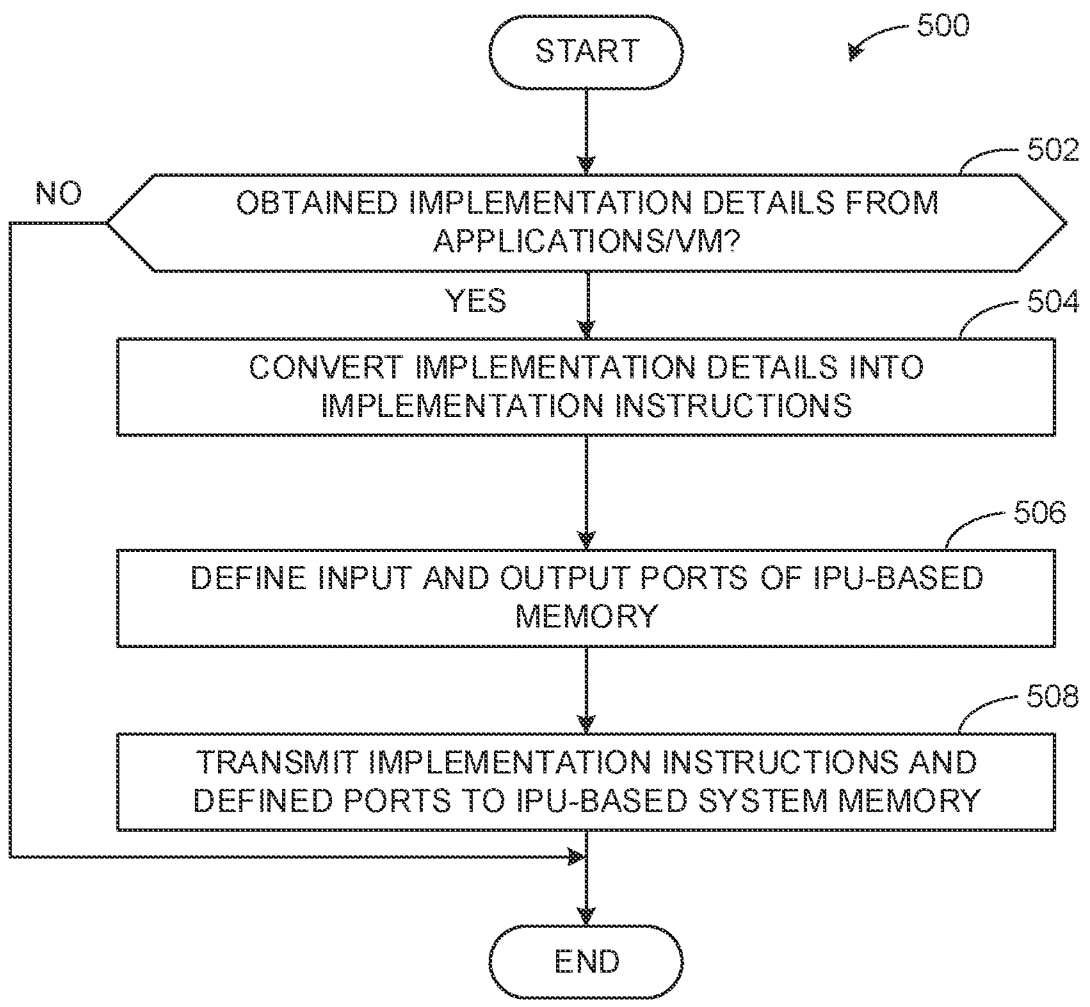
FIGS. 5-6 illustrate flowcharts representative of example machine readable instructions that may be executed to implement the example switch acceleration logic and the example operating system/hypervisor of FIGS. 2-4.
Figure 6:
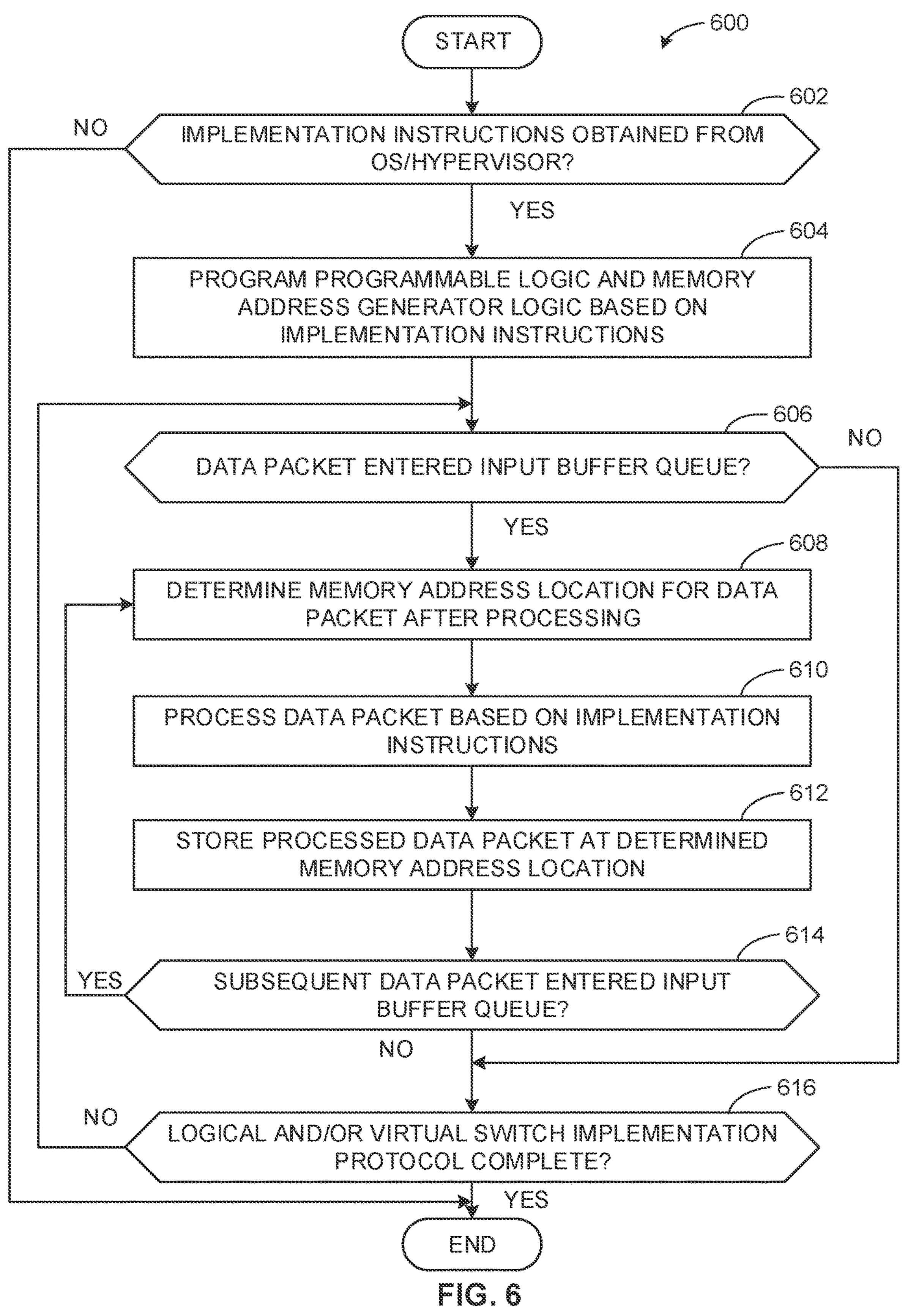
Figure 7:
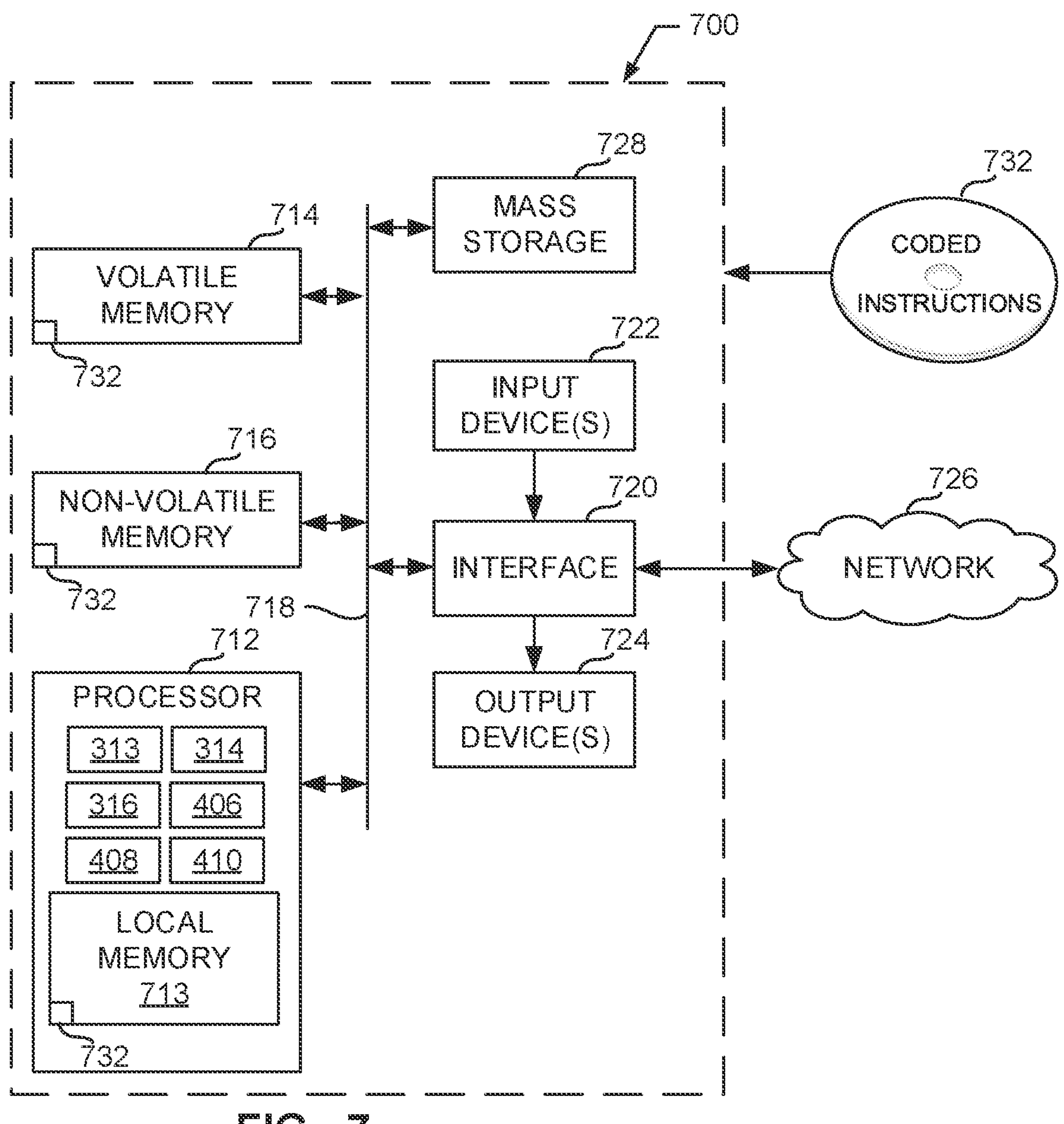
FIG. 7 is a block diagram of an example processor platform structured to execute the instructions of FIG. 5-6 to implement the example switch acceleration logic and the example operating system/hypervisor of FIGS. 2-4.

Flowcharts representative of example hardware logic, machine readable instructions, hardware implemented state machines, and/or any combination thereof for implementing the example processing system 700 of FIG. 7 are shown in FIGS. 5-6. The machine readable instructions may be one or more executable programs or portion(s) of an executable program for execution by a computer processor such as the processor 712 shown in the example processor platform 700 discussed below in connection with FIG. 7. The program(s) may be embodied in software stored on a non-transitory computer readable storage medium such as a CD-ROM, a floppy disk, a hard drive, a DVD, a Blu-ray disk, or a memory associated with the processor 712, but the entirety of the program(s) and/or parts thereof could alternatively be executed by a device other than the processor 712 and/or embodied in firmware or dedicated hardware. Further, although the example program(s) is/are described with reference to the flowchart illustrated in FIG. 5-6, many other methods of implementing the example processing system 700 of FIG. 7 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 5 illustrates a flowchart representative of example machine readable instructions 500 that may be executed to implement the example application 104 (FIGS. 2 and/or 4) to setup logical and virtual switch acceleration in hardware.

Although the flowchart of FIG. 5 is described in conjunction with the example processing system 200, other type(s) of processing unit(s) may be utilized instead.

At block 502, the example programmable logic generator 408 determines the example VM/container/application interface 406 has obtained implementation details from VMs, containers, and/or applications interface 406. As described above, the implementation details may include input ports (e.g., the input packet buffers 412 where inbound data packets will be stored in the system memory 206), output ports (e.g., the output packet buffers 414 where the processed data packets will be stored), an input to output buffer mapping, and/or the packet processing information (e.g., functions, operations, and/or instructions corresponding to how the data packets are to be processed).

If the example programmable logic generator 408 determines that the example VM/container/application interface 406 has not obtained implementation details (block 502: NO), then control ends. If the example programmable logic generator 408 determines that the example VM/container/application interface 406 has obtained implementation details (block 502: YES), the example programmable logic generator 408 converts the implementation details into implementation instructions (block 504) that can be used by the example acceleration logic 207 to program and/or configure the memory address generator 314 and/or the programmable logic 316 to perform virtual switching and/or logical switching based on the implementation details.

At block 506, the example programmable logic generator 408 defines the input and output ports (e.g., the input packet buffers 412 and the output packet buffers 414) of the memory cells 312 that will be reserved for input data and output data. The example programmable logic generator 408 may define the ports based on a protocol, user and/or manufacturer preferences, and/or based on instructions from an application, VM, etc. At block 508, the example programmable logic generator 408 uses the example component interface 410 to transmit the implementation instructions and defined ports to the example IPU based system memory 206 and/or to the example NIC/IPU 210/102. The example acceleration logic 207 of the IPU based system memory 206 uses the implementation instructions to program the destination address generator 314 and/or the programmable logic 316 and the NIC/IPU 210/102 may use the defined ports to know where to store input data and/or access output data in/from the example system memory 206.

FIG. 6 illustrates a flowchart representative of example machine readable instructions 600 that may be executed to implement the example acceleration logic 207 (FIGS. 2 and/or 3) to implement logical and virtual switch acceleration in hardware. Although the flowchart of FIG. 6 is described in conjunction with the example processing system 200, other type(s) of processing unit(s) may be utilized instead. For example, the instruction 600 may be used in conjunction with the acceleration logic 207 being implemented in the NIC/IPU 210/102 on data in local memory and/or the system memory 206.

At block 602, the example component interface 313 determines if implementation instructions have been obtained from the OS/hypervisor 204. If the example component interface 313 determines that implementation instructions have not been obtained from the OS/hypervisor 204 (block 602: NO), control ends. If the example component interface 313 determines that implementation instructions have not been obtained from the OS/hypervisor 204 (block 602: YES), the example programmable logic 316 programs the logic to implement the function, operation, etc., defined in the implementation instructions and the example memory address generator 314 implements a forwarding table based on the implementation instructions that defines where to store processed packets (block 604).

At block 606, the example memory address generator 314 and/or the example programmable logic 316 determines if a data packet has entered the input buffer queue 412. For example, the memory address generator 314, the programmable logic 316, or another device may read and/or poll the entries of the input buffers 412 to identify if new data has been stored in the example input buffers 412. If the example memory address generator 314 and/or the example programmable logic 316 determines that a data packet has not entered into the input buffers (block 606: NO), control continues to block 616, as further described below. If the example memory address generator 314 and/or the example programmable logic 316 determines that a data packet has entered into the input buffers (block 606: YES), the example memory address generator 314 determines a memory address location for the data packet to be stored after processing (block 608). The memory address generator 314 may determine the destination memory address location based on a forwarding table implemented in the example memory address generator 314 (e.g., based on the implementation instructions).

At block 610, the example programmable logic 316 processes the data packet based on the implementation instructions. For example, the implementation instructions may set forth a function or operation for the programmable logic 316 to perform on a data packet (e.g., rewrite or adjust the header of a data packet, decrement a TTL counter, etc.). At block 612, the example memory address controller outputs one or more control signals to drivers corresponding to the memory cells 312 to cause data output by the example programmable logic 316 to be stored in the output packet buffer corresponding to the memory address location determined by the memory address generator 314. At the same time, the programmable logic 316 outputs the processed data packet, thereby causing the processed data packet to be stored at the determined memory address location corresponding to the output packet buffer 414.

At block 614, the example component interface 313 determines whether a subsequent data packet has entered the input buffer queue 412. If the example component interface 313 determines that a subsequent data packet has entered the input buffer queue 412 (block 614: YES), control returns to block 608 to process the subsequent data packet. If the example component interface 313 determines that a subsequent data packet has not entered the input buffer queue 412 (block 614: NO), the example component interface 313 determines if the local and/or virtual switch implementation protocol is complete (block 616). The protocol may be complete based on an instruction from the example OS/hypervisor 204, for example. If the example component interface 313 determines that the local and/or virtual switch implementation protocol is not complete (block 616: NO), control returns to block 606. If the example component interface 313 determines that the local and/or virtual switch implementation protocol is complete (block 616: YES), control ends.

FIG. 7 is a block diagram of an example processor platform 700 structured to execute the instructions of FIGS. 5 and 6 to implement components of the acceleration logic 207 and/or the example OS/hypervisor 204 of FIGS. 3 and 4. The processor platform 700 can be, for example, a server, a personal computer, a workstation, a self-learning machine (e.g., a neural network), a mobile device (e.g., a cell phone, a smart phone, a tablet such as an iPad™), or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 712 implements the example component interface 313, the example memory address generator 314, the example programmable logic 316, the example VM/container/application interface 406, the example programmable logic generator 408, and the example component interface 410 of FIGS. 3 and/or 4.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device (s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip, and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives. In some examples, any one of the example local memory 713, the example volatile memory 714, the example non-volatile memory 715, and/or the example mass storage 728 may implement the example system memory 206.

The machine executable instructions 732 of FIGS. 5-6 may be stored in the mass storage device 728, in the volatile memory 714, in the non-volatile memory 716, and/or on a removable non-transitory computer readable storage medium such as a CD or DVD.

Example methods, apparatus, systems, and articles of manufacture to process data packets for logical and virtual switch acceleration in memory are disclosed herein. Further examples and combinations thereof include the following.

Example 1 includes Memory circuitry to switch data packets in memory, the memory circuitry comprising an input packet buffer to store an inbound data packet from a network, an output packet buffer to store an outbound data packet to transmitted via the network, and programmable logic to read the inbound data packet from the input packet buffer, process the inbound data packet to determine the outbound data packet, and output the outbound data packet to the output packet buffer.

Example 2 includes the memory circuitry of example 1, wherein the output packet buffer is a first one of a plurality of output packet buffers, and further including an address generator to Determine, based on a look up table, that the outbound data packet is to be stored in the first one of the plurality of output packet buffers, and output a control signal to a driver to cause the outbound data packet to be stored at the first one of the output packet buffers.

Example 3 includes the memory circuitry of examples 1-2, wherein the address generator is to determine that the outbound data packet is to be stored in the output packet buffer based on a forwarding table.

Example 4 includes the memory circuitry of examples 1-3, further including a component interface to obtain instructions corresponding to implementation of the forwarding table.

Example 5 includes the memory circuitry of examples 1-4, further including a component interface to obtain instructions from an operating system to program the programmable logic to process the inbound data packet according to a protocol.

Example 6 includes the memory circuitry of examples 1-5, wherein the programmable logic is to process the inbound data packet without invoking resources of a central processing unit.

Example 7 includes the memory circuitry of examples 1-6, further including memory cells, the input packet buffer including a first group of the memory cells and the output packet buffer including a second group of the memory cells.

Example 8 includes At least one computer readable storage medium comprising computer readable instructions which, when executed, cause programmable logic in memory to at least implement a packet processing protocol specified by an operating system, read an inbound data packet from an input buffer, the inbound data packet from a network, process the inbound data packet based on the packet processing protocol to determine an outbound data packet, and output the outbound data packet to an output buffer to cause the outbound data packet to be transmitted via the network.

Example 9 includes the at least one computer readable storage medium of examples 8, wherein the instructions cause the programmable logic to Determine, based on a look up table, that the outbound data packet is to be stored in a first one of a plurality of output packet buffers, and output a control signal to a driver to cause the outbound data packet to be stored at the first one of the output packet buffers.

Example 10 includes the at least one computer readable storage medium of examples 8-9, wherein the instructions cause the programmable logic to determine that the outbound data packet is to be stored in the output buffer based on a forwarding table.

Example 11 includes the at least one computer readable storage medium of examples 8-10, wherein the instructions cause the programmable logic to obtain data corresponding to the forwarding table from the operating system.

Example 12 includes the at least one computer readable storage medium of examples 8-11, wherein the instructions cause the programmable logic to process the inbound data packet without invoking resources of a central processing unit.

Example 13 includes the at least one computer readable storage medium of examples 8-12, wherein the input buffer includes a first group of memory cells and the outbound data packet includes a second group of the memory cells.

Example 14 includes a method to switch data packets in memory, the method comprising reading an inbound data packet from an input packet buffer, the inbound data packet from a network, processing, with programmable logic of the memory, the inbound data packet to determine an outbound data packet, and outputting the outbound data packet to an output packet buffer.

Example 15 includes the method of example 14, further including determining, based on a look up table, that the outbound data packet is to be stored in the first one of the plurality of output packet buffers, and outputting a control signal to a driver to cause the outbound data packet to be stored at the first one of the output packet buffers.

Example 16 includes the method of examples 14-15, further including determining that the outbound data packet is to be stored in the output packet buffer based on a forwarding table.

Example 17 includes the method of examples 14-16, further including obtaining instructions corresponding to the forwarding table.

Example 18 includes the method of examples 14-17, further including obtaining instructions from an operating system to program the programmable logic to process the inbound data packet according to a protocol.

Example 19 includes the method of examples 14-18, wherein the processing of the inbound data packet is performed without invoking resources of a central processing unit.

Example 20 includes the method of examples 15-19, wherein the input packet buffer includes a first group of memory cells and the output packet buffer includes a second group of the memory cells.

Example 21 includes a memory to process data packets for logical and virtual switch acceleration in memory, the memory comprising first means for storing an inbound data packet from a network, Second means for storing an outbound data packet to be transmitted via the network, and means for processing the inbound data packet based on a protocol configured by an instruction from an operating system to determine the outbound data packet, the means for processing to access the inbound data packet from the first means, and output the outbound data packet to the second means.

Example 22 includes the memory of example 21, further including second means for determining that the outbound data packet is to be stored in a first one of a plurality of output packet buffers, the means for processing to output a control signal to a driver to cause the outbound data packet to be stored in the first one of the output packet buffers.

Example 23 includes the memory of examples 21-22, wherein the second means for determining is to determine that the outbound data packet is to be stored in the second means for storing based on a forwarding table.

Example 24 includes the memory of examples 21-23, further including means for obtaining instructions corresponding to the forwarding table.

Example 25 includes the memory of examples 21-24, further including means for obtaining instructions from the operating system to program the means for processing to program the inbound data packet using a processing protocol.

Example 26 includes the memory of examples 21-25, wherein the means for processing is to process the inbound data packet without using resources of a central processing unit.

Example 27 includes the memory of examples 21-16, further including memory cells, the first means including a first group of the memory cells and the second means including a second group of the memory cells.

From the foregoing, it will be appreciated that example methods, apparatus and articles of manufacture have been disclosed herein to process data packets for logical and virtual switch acceleration in memory. Disclosed methods, apparatus, and articles of manufacture process data packets for logical and/or virtual switching protocols using in memory programmable logic rather than having an OS obtain the data from memory and processor. In this manner, CPU/GPU resources and I/O bandwidth is conserved to free up the OS to perform other tasks. Accordingly, methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. Memory comprising:

memory cells including a plurality of input packet buffers and a plurality of output packet buffers to store packets;

interface circuitry to access at least one instruction including data to implement a forwarding table and at least one virtual switching action associated with a virtual switching protocol;

at least one programmable logic circuit to be programmed by the at least one instruction to:

read an inbound data packet from an input packet buffer of the plurality of input packet buffers in the memory cells;

perform the at least one virtual switching action on the inbound data packet to determine an outbound data packet without invoking computational resources outside the memory, the at least one virtual switching action to modify a header of the inbound data packet based on the virtual switching protocol to determine the outbound data packet; and output the outbound data packet to an output packet buffer of the plurality of output packet buffers in the memory cells; and address generator circuitry to:

determine, based on the forwarding table, an output address for the outbound data packet to be stored after the virtual switching action is performed, the output address associated with the output packet buffer of the plurality of output packet buffers; and based on performance of the at least one virtual switching action, output a control signal to a driver corresponding the output packet buffer of the memory cells to cause the outbound data packet to be stored at the output address.

2. The memory of claim 1, wherein the forwarding table is implemented by a look up table.

3. The memory of claim 1, wherein the virtual switching protocol defines how to process the inbound data packet to determine the outbound data packet.

4. The memory of claim 1, wherein one or more of the at least one programmable logic circuit is to perform the at least one virtual switching action on the inbound data packet without invoking resources of a central processing unit.

5. The memory of claim 1, wherein the input packet buffer is in a first group of the memory cells and the output packet buffer is in a second group of the memory cells.

6. The memory of claim 1, wherein the at least one virtual switching action includes at least one of rewriting the header, adjusting the header, or decrementing a time-to-live counter of the inbound data packet.

7. The memory of claim 1, wherein the control signal causes the driver to activate at least one memory cell corresponding to the output packet buffer to permit storage of the outbound data packet in the output packet buffer.

8. At least one non-transitory computer readable storage medium comprising instructions which cause in-memory compute circuitry to at least:

read an inbound data packet from an input buffer in memory cells of memory, the inbound data packet from a network, the memory cells including a plurality of input buffers and an a plurality of output buffers to store packets;

perform at least one virtual switching action on the inbound data packet to determine an outbound data packet without invoking computational resources outside the memory, the at least one virtual switching action implemented based on data included in the instructions, the at least one virtual switching action associated with a packet processing protocol, the at least one virtual switching action to modify a header of the inbound data packet based on the packet processing protocol to determine the outbound data packet;

output the outbound data packet to an output buffer of the plurality of output buffers in the memory cells of the memory to cause the outbound data packet to be transmitted via the network;

based on a forwarding table, determine an output address for the outbound data packet to be stored after the at least one virtual switching action is performed, the output address associated with the output buffer of the plurality of output buffers, the forwarding table implemented based on the data included in the instructions; and based on performance of the at least one virtual switching action, output a control signal to a driver corresponding the output buffer of the memory cells to cause the outbound data packet to be stored at the output address.

9. The at least one non-transitory computer readable storage medium of claim 8, wherein the forwarding table is implemented by a look up table.

10. The at least one non-transitory computer readable storage medium of claim 8, wherein the instructions cause the in-memory compute circuitry to perform the at least one virtual switching action on the inbound data packet without invoking resources of a central processing unit.

11. The at least one non-transitory computer readable storage medium of claim 8, wherein the input buffer is in a first group of the memory cells and the outbound data packet is in a second group of the memory cells.

12. The at least one non-transitory computer readable storage medium of claim 8, wherein the at least one virtual switching action includes at least one of rewriting the header, adjusting the header, or decrementing a time-to-live counter of the inbound data packet.

13. The at least one non-transitory computer readable storage medium of claim 8, wherein the control signal causes the driver to activate at least one memory cell corresponding to the output buffer to permit storage of the outbound data packet in the output buffer.

14. A method comprising:

accessing, with interface circuitry, at least one instruction including data to implement a forwarding table and at least one virtual switching action associated with a virtual switching protocol;

accessing, with at least one programmable logic circuit in memory, the at least one instruction, the memory including memory cells partitioned into a plurality of input packet buffers and a plurality of output packet buffers to store packets;

reading, with one or more of the at least one programmable logic circuit, an inbound data packet from an input packet buffer of the plurality of input packet buffers in the memory cells, the inbound data packet from a network;

performing, with one or more of the at least one programmable logic circuit, the at least one virtual switching action on the inbound data packet to determine an outbound data packet without invoking computational resources outside the memory, the at least one virtual switching action to modify a header of the inbound data packet based on the virtual switching protocol to determine the outbound data packet;

outputting, with one or more of the at least one programmable logic circuit, the outbound data packet to an output packet buffer of the plurality of output packet buffers in the memory cells, the at least one programmable logic circuit programmed by instructions including the at least one instruction;

based on the forwarding table, determining, with address generator circuitry, an output address for the outbound data packet to be stored after the virtual switching action is performed, the output address associated with the output packet buffer of the plurality of output packet buffers; and based on performance of the at least one virtual switching action, outputting, with the address generator circuitry, a control signal to a driver corresponding the output packet buffer of the memory cells to cause the outbound data packet to be stored at the output address.

15. The method of claim 14, wherein the forwarding table is implemented by a look up table.

16. The method of claim 14, wherein the virtual switching protocol defines how to process the inbound data packet to determine the outbound data packet.

17. The method of claim 14, wherein the performing of the at least one virtual switching action on the inbound data packet is performed without invoking resources of a central processing unit.

18. The method of claim 14, wherein the input packet buffer is in a first group of the memory cells and the output packet buffer is in a second group of the memory cells.

19. The method of claim 14, wherein the at least one virtual switching action includes at least one of rewriting the header, adjusting the header, or decrementing a time-to-live counter of the inbound data packet.

20. The method of claim 14, wherein the control signal causes the driver to activate at least one memory cell corresponding to the output packet buffer to permit storage of the outbound data packet in the output packet buffer.

21. A memory comprising:

means for obtaining at least one instruction, the at least one instruction including data to implement a forwarding table and at least one virtual switching action associated with a virtual switching protocol;

means for storing data, the means for storing data including memory cells including a plurality of input packet buffers and a plurality of output packet buffers to store packets;

means for processing to be programmed by the at least one instruction, the means for processing to perform the at least one virtual switching action on an inbound data packet to determine an outbound data packet without invoking computational resources outside the memory, the at least one virtual switching action to modify a header of the inbound data packet based on the virtual switching protocol to determine the outbound data packet, the means for processing to:

access the inbound data packet from an input packet buffer of the plurality of input packet buffers in the means for storing data; and output the outbound data packet to an output packet buffer of the plurality of output packet buffers in the means for storing data; and means for determining an output address for the outbound data packet to:

determine, based on the forwarding table, the output address for the outbound data packet to be stored after the virtual switching action is performed, the output address associated with the output packet buffer of the plurality of output packet buffers; and based on performance of the at least one virtual switching action, output a control signal to a driver corresponding the output packet buffer of the memory cells to cause the outbound data packet to be stored at the output address.

22. The memory of claim 21, wherein the virtual switching protocol defines how to process the inbound data packet to determine the outbound data packet.

23. The memory of claim 21, wherein the at least one virtual switching action includes at least one of rewriting the header, adjusting the header, or decrementing a time-to-live counter of the inbound data packet.

24. The memory of claim 21, wherein the means for processing is to perform the at least one virtual switching action on the inbound data packet without invoking resources of a central processing unit.

25. The memory of claim 21, wherein the memory cells including a first group of the memory cells corresponding to the input packet buffer and a second group of the memory cells corresponding to the output packet buffer.

* * * * *